United States Patent
Thielsch et al.

(10) Patent No.: US 7,508,586 B2
(45) Date of Patent: Mar. 24, 2009

(54) ZINC-BASED FILM MANIPULATION FOR AN OPTICAL FILTER

(75) Inventors: Roland Thielsch, Dresden (DE); Thomas Boehme, Dittersbach (DE); Chris H. Stoessel, Santa Rosa, CA (US); Lee Boman, Belmont, CA (US)

(73) Assignee: Southwall Technologies, Inc., Palo Alto, CA (US)

( * ) Notice: Subject to any disclaimer, the term of this patent is extended or adjusted under 35 U.S.C. 154(b) by 315 days.

(21) Appl. No.: 11/404,391

(22) Filed: Apr. 14, 2006

(65) Prior Publication Data
US 2007/0242359 A1 Oct. 18, 2007

(51) Int. Cl.
*G02B 1/10* (2006.01)
(52) U.S. Cl. ............... 359/585; 359/582; 359/588
(58) Field of Classification Search ............ None
See application file for complete search history.

(56) References Cited

U.S. PATENT DOCUMENTS

| | | | |
|---|---|---|---|
| 4,902,580 A | 2/1990 | Gillery | 428/623 |
| 5,506,037 A * | 4/1996 | Termath | 428/216 |
| 5,821,001 A | 10/1998 | Arbab et al. | 428/623 |
| 6,398,925 B1 | 6/2002 | Arbab et al. | 204/192.22 |
| 6,531,230 B1 | 3/2003 | Weber et al. | 428/480 |
| 6,562,490 B2 | 5/2003 | Ebisawa et al. | 428/697 |
| 6,579,423 B2 | 6/2003 | Anzaki et al. | 204/192.15 |
| 6,699,585 B2 * | 3/2004 | Ebisawa et al. | 428/432 |
| 6,833,194 B1 | 12/2004 | O'Shaughnessy | 428/432 |
| 6,965,191 B2 | 11/2005 | Koike et al. | 313/112 |
| 2008/0057264 A1 * | 3/2008 | Morimoto et al. | 428/98 |

* cited by examiner

*Primary Examiner*—Arnel C Lavarias
(74) *Attorney, Agent, or Firm*—Schneck & Schneck; Terry McHugh

(57) ABSTRACT

An optical filter is formed of a layer stack that includes metallic layers and dielectric layers, with at least one dielectric layer being defined by more than one zinc-based film. These zinc-based films have different percentages of zinc. The selections of the percentages are based upon the positions of the films within the dielectric layer. An unexpectedly low sheet resistance is available if the zinc-based film that immediately precedes forming a metallic layer has a percentage of zinc in the range of 80 percent to next to 100 percent. Process stabilization and manufacturing cost are provided by placing the percentage of the lower zinc-based film closer to 50 percent (25-75). Process stabilization is further enhanced by providing an indium-based film within the dielectric layer adjacent to the metallic layer.

10 Claims, 3 Drawing Sheets

ZINC-BASED FILM MANIPULATION FOR AN OPTICAL FILTER

TECHNICAL FIELD

The invention relates generally to providing an optical arrangement and more particularly to providing a cost-effective optical filter having target optical properties and a low sheet resistance.

BACKGROUND ART

The selection of target optical properties for a filter will vary significantly, depending upon the intended application. For example, U.S. Pat. No. 5,071,206 to Hood et al., which is assigned to the assignee of the present patent document, describes a filter arrangement which may be used for automotive, housing and office windows. The Hood et al. patent states that the arrangement of layers provides color correction, heat reflectivity and infrared reflectivity. In comparison, the desired properties of a coating for a plasma display panel (PDP) may be somewhat different. Published U.S. Patent Application No. 2006/0055308 to Lairson et al., which is also assigned to the assignee of the present patent document, describes factors which are considered in the design of an optical filter for a PDP. The identified factors are the degree of neutrality of transmitted color, the level of reflected light, the color shift with changes in the incidence angle of a viewer, and the transmission levels of infrared and electromechanical radiation. Unfortunately, whether designing an optical filter for coating windows or coating a PDP, there are tradeoffs among the different factors. Thus, modifying a filter to increase conditions with respect to one desired property may conflict with maintaining a target level for another property.

FIG. 1 is one possible arrangement of layers to provide a filter for a plasma display panel, which includes a module or separate glass sheet 10. The Etalon filter 12 is first formed on a polyethylene terephthalate (PET) substrate 14 that is then affixed to the glass sheet by a layer of adhesive 16. Because a plasma display generates infrared radiation and electromagnetic interference (EMI) that must be controlled in accordance with legislated regulations, the filter layers 12 are designed to reduce infrared and EMI from the display. Etalon filters based on multiple silver layers are used to screen infrared wavelengths and electromagnetic waves. Interference between adjacent silver layers can be tuned to cause resonant transmission in the visible region, while providing desirable screening. The above-referenced patent to Hood et al. describes a suitable sequence of layers.

FIG. 1 also includes an antireflection (AR) layer stack 18 that was originally formed on a second PET substrate 20. Antireflection layer stacks are well known in the art. A second adhesive layer 22 secures the PET substrate 20 to the other elements of FIG. 1.

While the PDP filter 12 reduces infrared transmission and EMI from the display, the filter must also be cosmetically acceptable and must enable good fidelity in the viewing of displayed images. Thus, the transmissivity of the filter should be high in the visual region of the light spectrum and should be relatively colorless, so as not to change the color rendering of the plasma display. Further, a general expectation exists that displays should be low in reflectance and that the reflected color be bluish to slightly reddish.

Color can be expressed in a variety of fashions. In the above-cited Hood et al. patent, color is expressed in the CIE La*b*1976 color coordinate system and in particular the ASTM 308-85 method. Using this method, a property is shown by values for a* and b* near 0. Generally, consumers expect that computer displays will appear either neutral or slightly bluish in color. Referring briefly to the La*b* coordinate system shown in FIG. 2, this generally yields the expectation that reflected a* (i.e., Ra*) lies in the range of −2 to approximately 10, and reflected b* (i.e., Rb*) lies in the range −40 to approximately 2. This expectation is shown by dashed lines 23.

Users of large information displays generally expect minimal change in reflected color with changes in the viewing angle. Any color change is distracting when a display is viewed from a close distance, where the color of the display appears to change across the surface. Since plasma display panels are intrinsically large, due to the large number of pixels required for imaging and the large pixel size, the need for reduced color travel with viewing angle is heightened. In particular, it is objectionable if the "red-green" component of color, Ra*, changes substantially with angle. Changes along the other axis, Rb*, are generally less of an issue when the display has large reflected negative Rb* (i.e., strong blue reflected color) at normal incidence.

As previously noted, different factors regarding the design of PDP filters may conflict. The same is true in the design of a filter for a window. Generally, controlling reflected color competes with EM screening capability. Typical silver etalon filters work to screen infrared rays primarily by reflecting the rays. Infrared radiation is relatively close in wavelength to red and is therefore difficult to effectively control while simultaneously obtaining low reflection in the red region of the spectrum (i.e., 620-700 nm). The problem is particularly acute for plasma displays, where it is desirable to shield from Xe emissions at 820 nm and 880 nm while maintaining high transmissivity in the red region of the spectrum.

Controlling reflection within the red region of the light spectrum is rendered even more difficult by the need for a low sheet resistance in the PDP filter 12. Attempts have been made to balance the goals of maximizing red transmission and minimizing sheet resistance. U.S. Pat. No. 6,102,530 to Okamura et al. describes an optical filter for plasma displays, where the filter has a sheet resistance of less than 3 ohms/square. Generally, a sheet resistance of less than 1.5 ohms/square is required to meet Federal Communication Commission (FCC) Class B standard, even for PDP sets having the highest luminance efficiencies. A sheet resistance of less than 1.4 ohms/square is preferred. Copper wire mesh PDP EMI filters having a sheet resistance of 0.1 to 0.2 ohms/square are often used to provide Class B compatibility.

The requirement for lower sheet resistance increases the color problem for etalon EMI filters. The transmission bandwidth of the filter becomes narrower as the conductive layers become thicker, resulting in both an increase in the red reflection and a loss of color bandwidth in transmission.

There is a conflict between the tendency of Etalon filters to show red reflection at different viewing angles and the generally expected appearance of consumer products. This is known from the design of automotive windshields, where a disagreeable "purple" appearance is produced by reflections of clouds from certain windshields. This objectionable reflection limits the thickness of the conductive layers used in such filters.

FIG. 2 illustrates the difficulty with a four silver layer coating designed for a PDP. The plot 24 shows color as a function of viewing angle from normal incidence to 60 degrees. The four silver layer coating may have an acceptable sheet resistance and may have a total silver thickness of 45 nm to provide an acceptable color appearance at normal incidence. However, as the illustration shows, when the coating is viewed at 60 degrees, the reflected light is strongly red, with Ra* of approximately 30. In addition, there is a large color shift with incidence angle, which creates an apparent color difference across the screen for a large screen viewed at a close distance. Thus, despite the suitability of the coating for some Class B EMI applications, this coating may be considered cosmetically unacceptable.

The above-cited reference to Lairson et al. describes a filter arrangement having a number of advantages over prior techniques. The filter arrangement includes at least five metallic layers, such as silver or silver alloy layers, that are spaced apart by dielectric layers. There may be five metallic layers and six dielectric layers. The reference states that the dielectric layers may be indium oxide or a combination of indium oxide and titanium oxide.

While prior art approaches to providing optical filter arrangements show continuing advancements in achieving target levels with respect to desired properties, further advancements are sought. In the ideal, such advancements can be achieved while simultaneously reducing the cost.

SUMMARY OF THE INVENTION

In accordance with one embodiment of the invention, an optical filter is provided by forming a layer stack on a substrate such that the layer stack includes metallic layers and dielectric layers, with at least one dielectric layer being defined by more than one zinc-based film. In this embodiment, the zinc-based films have different percentages of zinc and the selections of the percentages are based upon different factors. In another embodiment of the invention, an optical filter is formed of a number of layers on a transparent substrate, with at least one layer having a zinc-based film in which the percentage of zinc is intentionally less than one hundred percent and greater than eighty percent. As used herein, the term "layer" is defined as one or more films that exhibit desired properties, such as achieving a particular refractive index. A "dielectric layer" within the "alternating pattern" of metallic and dielectric layers is defined herein as a layer having an index of refraction greater than 1.0. With respect to the zinc-based films, the refractive index is preferably the highest possible index obtainable with a Zn-based material.

The use of zinc-based films to form a dielectric layer provides a significant reduction in cost as compared to the formation of indium-based dielectric layers. Additionally, the tailoring of the percentages of zinc within the different zinc-based films that form a layer achieves performance advantages. One surprising result of forming the dielectric layer or layers in accordance with the first embodiment is that there is a smaller change in color as a function of viewing angle, as compared to above-cited approaches. Another surprising result is that the sheet resistance is lowered. For example, a sheet resistance of 1.25 ohms/square has been achieved. In the formation of a dielectric film, the first deposited zinc-based film has a percentage of zinc that is selected on the basis of factors that include process stabilization. The preferred range of this layer is twenty-five percent to seventy-five percent, but it is even more preferably approximately fifty percent (plus or minus five percent). The selection of the percentage of zinc in the subsequently formed zinc-based film is based upon factors that include establishing target properties of a seeding layer for the subsequently formed metallic layer. This second percentage of zinc is intentionally greater than the first percentage. The second percentage is in the range of eighty percent to one hundred percent, and is preferably approximately ninety percent.

The zinc-based films may be zinc tin (ZnSn), but other materials may be selected. The zinc and tin may be sputter deposited. In the sputter depositing embodiment, the terms "percent" and "percentage" are defined herein as referring to composition of the target material. To ensure that the layer is a dielectric layer, the fabrication enables oxidation. Thus, in the ZnSn embodiment, ZnO and $SnO_2$ are formed. However, one or both of the zinc-based films of each dielectric layer may be an alternative to ZnSn. For example, the first deposited zinc-based film may be ZnSn because of its stability in process, while the second zinc-based film may be Zn/aluminum because of its superiority as a seed layer for silver and silver alloys.

As a further enhancement, the dielectric layer may be formed of an initial film that is indium-based, such as $InO_x$. This initial film may be used in order to protect the previously formed metallic layer. By forming the indium-based film with a flow of high content hydrogen, an underlying silver layer is protected from oxidizing and the process is stable.

Thus, the first embodiment of the invention is one in which the dielectric layers are "hybrid layers" formed by two or more films having chemical properties selected on the basis of the positions of the films within the hybrid dielectric layer. In the second embodiment of the invention, the film of interest is a zinc-based film, such as ZnSn, with a zinc percentage within the range between eighty percent and one hundred percent. Such a film is particularly suitable for a seeding layer for silver, where the sheet resistance is significant to the final product.

DETAILED DESCRIPTION

Figure 3:
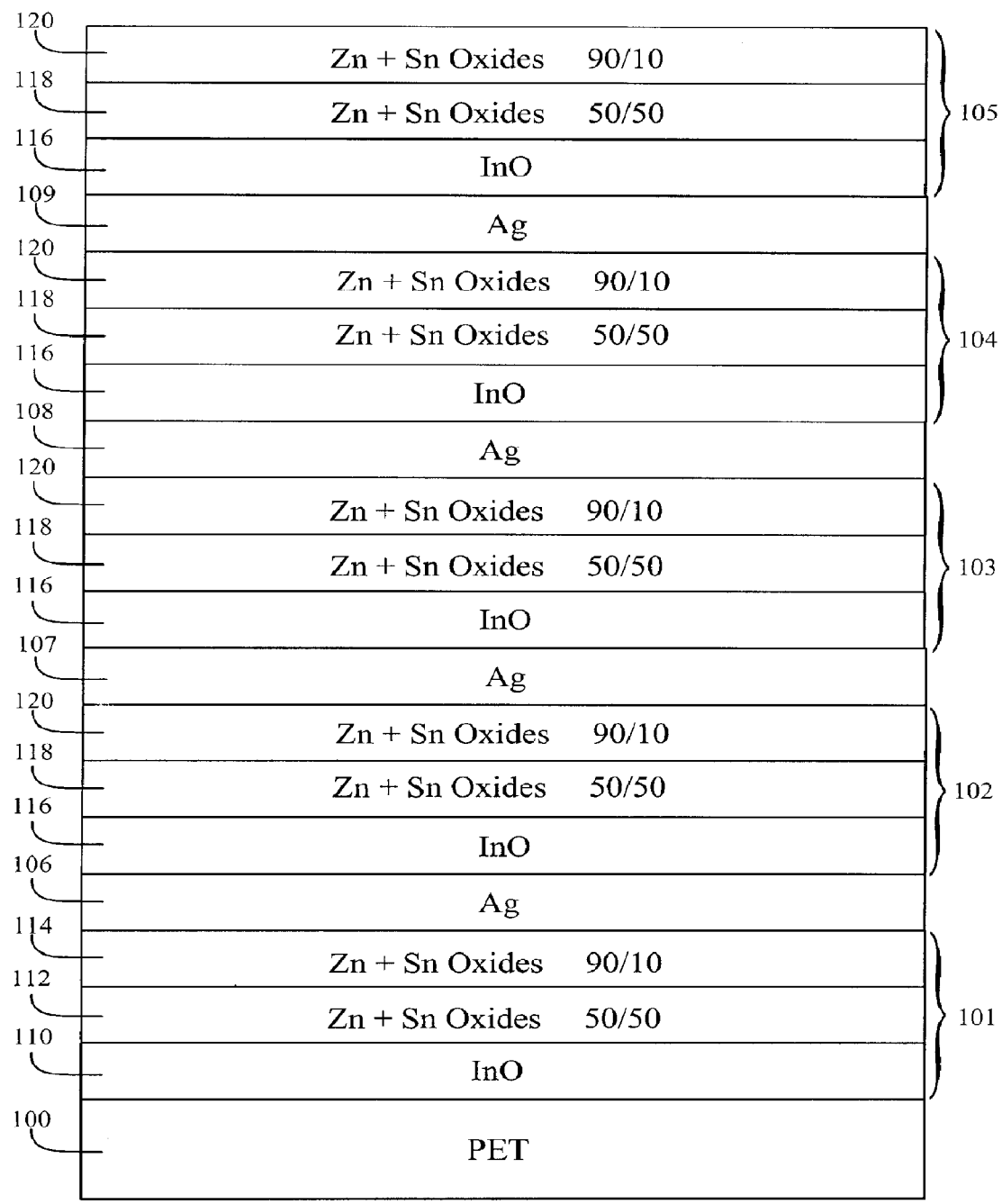
FIG. 3 is a side view of a succession of layers formed in accordance with one possible embodiment of the invention.

With reference to FIG. 3, an alternating pattern of layers is formed on a flexible polymeric substrate 100. The polymeric substrate may be PET having a thickness of twenty-five to one hundred microns. While not shown in FIG. 3, the side of the substrate opposite to the alternating pattern may include a layer of adhesive and a release strip. The release strip is easily removed from the adhesive, allowing the adhesive layer to be used to couple a substrate and its layers to a member for which filtering is desired. For example, the filtering arrangement may be adhered to a plasma display panel or to a window. In another embodiment, the alternating pattern is formed directly on the member for which filtering is desired. For example, it may be necessary to pass the panel through a sputter chamber for depositing the materials which form the layers.

FIG. 3 illustrates the preferred embodiment in which there are five dielectric layers 101, 102, 103, 104 and 105 and four metal layers 106, 107, 108 and 109. In the preferred embodiment, the metal layers are silver or silver alloy layers. The silver alloy layers may be formed by first sputtering silver and then sputtering a thin titanium cap layer that is subsequently subjected to annealing and oxidation. It has been shown that by annealing the metal layer, the sheet resistance of the layer may be reduced to 0.8 ohms/square. Acceptable silver alloys include AgAu and AgPd. Particularly when coating glass, the addition of a small percentage of Pd is known.

Figure 4:
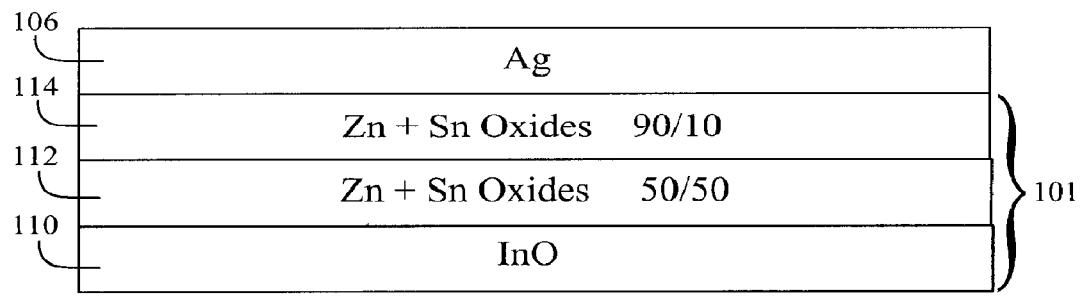
FIG. 4 is a side view of a portion of the layers of FIG. 3, showing one multi-film dielectric layer and one metallic layer.

Each dielectric layer 101, 102, 103, 104 and 105 is a "hybrid layer." In the illustrated embodiment, the first dielectric layer 101 is formed of three films 110, 112 and 114. This first dielectric layer is also shown in FIG. 4, in combination with its metal layer 106. Similarly, each of the second, third, fourth and fifth dielectric layers 102, 103, 104 and 105 is formed of three films 116, 118 and 120. The films and layers are not shown in scale. The metal layers 106, 107, 108 and 109 may have a thickness in the range of 5 nm to 15 nm, but other possibilities are considered. The total thickness of the three films that form a dielectric layer may be in the range of 50 nm to 100 nm, but alternatives are possible.

The dielectric layers 101, 102, 103, 104 and 105 are formed of the different oxidized films, 110, 112, 114, 116, 118 and 120 so that the different portions of the dielectric layer may be tailored to achieve different properties. The film closest to the substrate 100 is $InO_x$ that is formed with a flow of high hydrogen content in order to protect the underlying layer. This is particularly useful for the upper dielectric layers 102, 103, 104 and 105, because it will provide protection against oxidation of the underlying silver layer 106, 107, 108 and 109. Moreover, the formation of the indium-based layer is stable in sputter deposition. In a preferred embodiment, the layers and films are sputter deposited. However, the first dielectric layer 101 may also be deposited without InOx to reduce cost, and preferably is deposited with Zn-based alloys instead of the InOx, as the requirement to protect an underlying Ag layer is not present. Film 114, as with the first three films 120, should be selected for optimum nucleation conditions for the Ag layer.

While the indium-based film 110 and 116 provides advantages, such films are relatively expensive. Thus, the second film 112 and 118 of each dielectric layer 101, 102, 103, 104 and 105 is zinc-based. In the illustrated embodiment, the layers are ZnSn. FIGS. 3 and 4 show the percentage of zinc as being fifty percent. This is the preferred embodiment, but the range may be twenty-five percent to seventy-five percent. The target factors for selecting the percentage include cost and process stabilization. The third film 114 and 120 has a higher zinc content by weight. FIG. 3 again shows the film as being ZnSn. However, the factors for selecting the film include cost relative to the indium-based film 110 and 116 and quality as a seed layer for the subsequently formed metal layers 106, 107, 108 and 109. In addition to ZnSn, the zinc-based film may be formed of zinc and aluminum, since such a layer would provide a seed layer for the silver. The percentage of zinc shown in the illustrated embodiment is ninety percent by weight, but the percentage may vary within the range of eighty percent to slightly less than one hundred percent. This is also true for ZnAl films.

Figure 5:
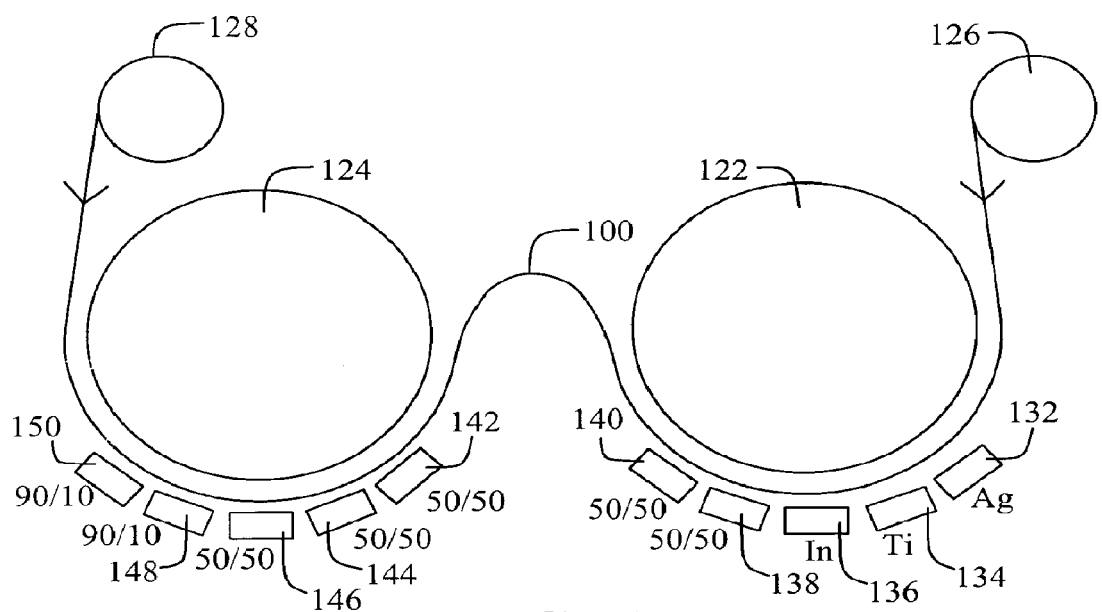
FIG. 5 is a representation of one possible embodiment of the process for providing the succession of layers on the substrate shown in FIG. 3.

One possible process for forming the optical filter of FIG. 3 will be described with reference to FIG. 5. However, persons skilled in the art will recognize that other configurations are available without diverging from the invention. For example, fewer cathodes may be used. In FIG. 5, a web of the flexible substrate 100 may be moved around drums 122 and 124 by clockwise and counterclockwise rotation of a pair of rolls 126 and 128. The roll 126 may be considered to be the supply roll for purposes of describing the invention. In the illustrated embodiment, the various layers 101 through 120 of FIG. 3 can be reactively and non-reactively sputter deposited onto the substrate.

In an initial pass, the substrate progresses past a silver deposition station 132 and a titanium deposition station 134 while the stations remain inactive. The indium station 136 therefore provides the first film of material onto the substrate. In practice, there may be a primer layer formed on the substrate, but the primer layer is not significant to the invention and is not shown in FIG. 3. As previously noted, the indium is deposited in an environment with a flow of high hydrogen. This is intended to protect an underlying silver layer. Thus, in the first pass, the indium oxide film is less significant than in the second pass. However, the first dielectric layer 101 may include all three films as shown in FIG. 3.

FIG. 5 shows five different ZnSn stations 138, 140, 142, 144, and 146 that provide the content of the first ZnSn film 112. Each of the five stations provides a film portion until the entire film is completed. Then, stations 148 and 150 cooperate to form the 90/10 film 114 of ZnSn. As previously noted and as shown in FIGS. 3 and 4, each of these films is oxidized to form layers of low absorption.

The rolls 126 and 128 are then swapped in order to place the substrate 100 in a position for a second pass. In this second pass, the silver layer 106 or silver alloy layer (e.g., AgAu or AgPd) is deposited by activation of the station 132. The thin titanium layer (less than 2 nm thickness) is deposited on the silver layer prior to deposition of the second dielectric layer 102. The titanium layer is used to protect the silver layer from oxidation.

The second dielectric layer 102 is formed in the same manner as the first dielectric layer 101. The rolls 126 and 128 are then again swapped and a third pass is executed in order to provide the second silver layer 107. This process is repeated until the desired number of dielectric and metal layers is achieved.

One advantage of the invention is that the resulting product had an unexpectedly low change in color with change in viewing angle. Another unexpected result was the low sheet resistance. A sheet resistance of 1.25 ohms/square was achieved for a coating stack comprised of five dielectric and four Ag layers, with a total Ag thickness of approximately 50 nm. Moreover, a reduction in cost is provided by the use of the zinc-based layers and the fact that fewer layers are required than other optical filters that provide similar or less desirable results. The process is stable and a lower cycling time in manufacturing is required. No anticorrosion coating need be added to the final product, as might be required for other filter arrangements of this type.

Figure 1:
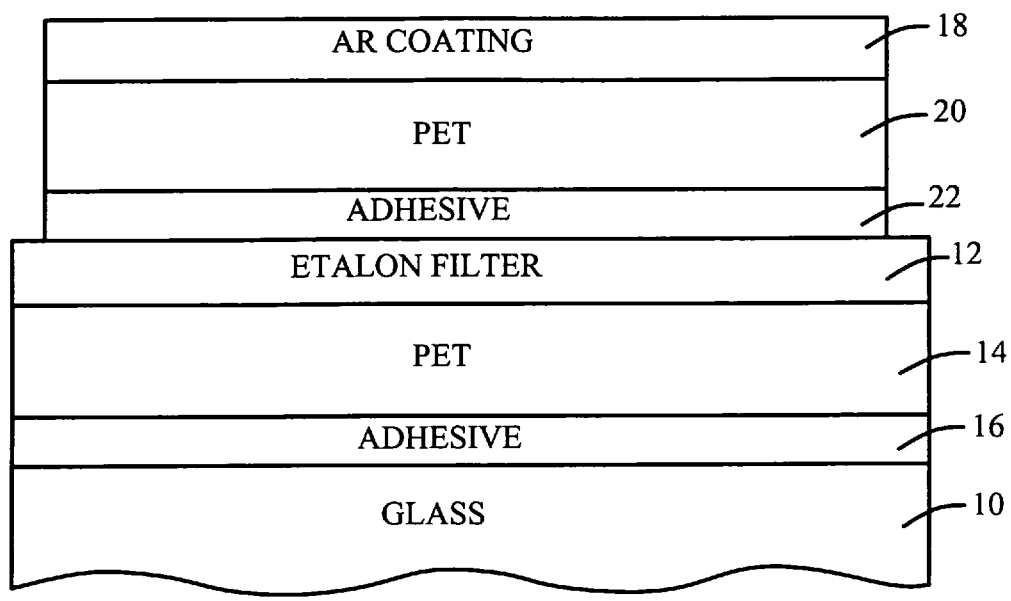
FIG. 1 is a side view of a filter arrangement to which the present invention may be applied.
Figure 2:
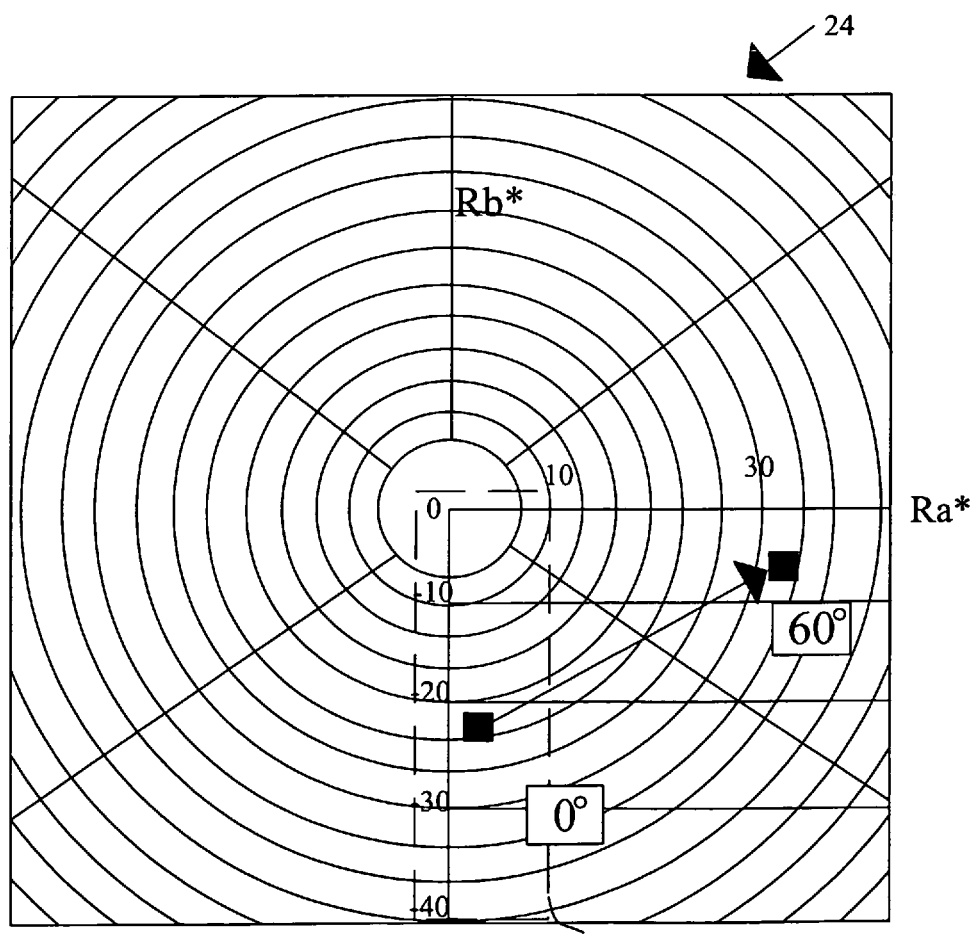
FIG. 2 is a plot of color as a function of viewing angle for a layer stack having four silver layers in accordance with the prior art.

The filter arrangement of FIG. 3 may be used with components of FIG. 1. When formed on a flexible web, the web may be cut as needed and then applied to glass or to a plasma display panel.

What is claimed is:

1. A filtering arrangement comprising:
   a transparent substrate; and
   a layer stack on said substrate, said layer stack including:
      a first metallic layer;
      first and second dielectric layers on opposite sides of said first metallic layer, said first dielectric layer being nearer to said substrate than said second dielectric layer, each said dielectric layer including a first zinc-based film and including a second zinc-based film with a greater percentage of zinc than said first zinc-based film so as to function as a seed film for a particular metal, said first metallic layer being a layer of said particular metal, said second dielectric layer including an indium-based film between said first metallic layer and said first zinc-based film of said second dielectric layer, said indium-based film being spaced apart from said second zinc-based film of said second dielectric layer by said first zinc-based film of said second dielectric layer; and a repeating pattern of layers to achieve a target sheet resistance, said repeating pattern including alternating layers of metal and dielectric.

2. The filtering arrangement of claim 1 wherein said percentage of zinc in said second zinc-based film is in the range between 80 percent and 100 percent.

3. The filtering arrangement of claim 2 wherein a percentage of zinc in said first zinc-based film is in the range of 25 percent to 75 percent.

4. The filtering arrangement of claim 2 wherein said first metallic layer is silver or a silver alloy and said first and second zinc-based layers are zinc-tin layers.

5. The filtering arrangement of claim 1 wherein said first zinc-based film includes an indium-based film between said substrate and said first zinc-based film.

6. The filtering arrangement of claim 1 wherein said substrate is attached to a plasma display panel.

7. The filtering arrangement of claim 1 wherein said filtering arrangement has a total of four said metallic layers and five said dielectric layers.

8. The filtering arrangement of claim 1 wherein each said layer of dielectric of said repeating pattern includes first and second films that are zinc-based, said first film being nearer said substrate than said second film, each said second film having a greater percentage of zinc than said first films.

9. The filtering arrangement of claim 8 wherein each layer of dielectric of said repeating pattern further includes a film that is indium-based and that is nearer to said substrate than said first film.

10. The filtering arrangement of claim 8 wherein each layer of metal in said repeating pattern is a layer of said particular metal.

* * * * *